L. N. TALBOTT.
SELF LUBRICATING AXLE.
APPLICATION FILED OCT. 16, 1915.
1,173,060.
Patented Feb. 22, 1916.
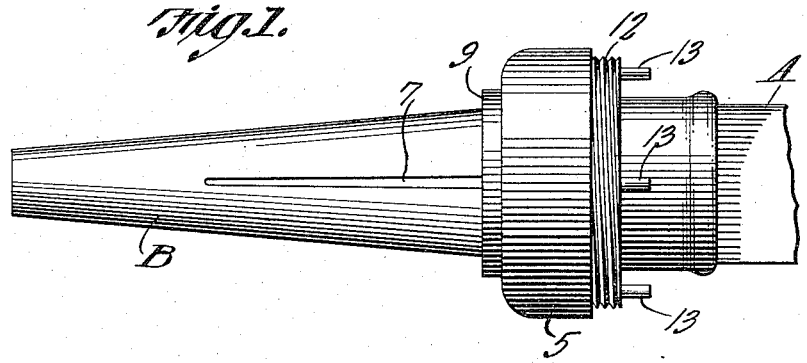
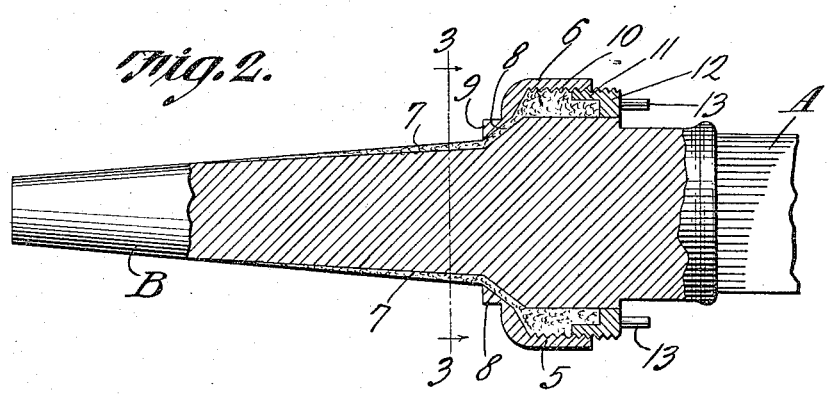
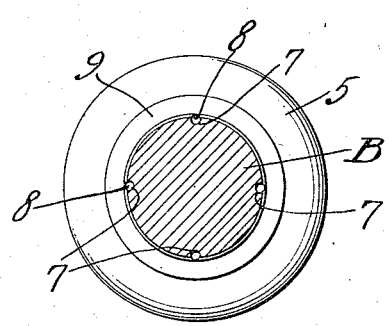
Witnesses
Ed. R. Lusby
E. A. Burnett
Inventor
L. N. Talbott
by David P. Moore
Attorney
THE COLUMBIA PLANOGRAPH CO., WASHINGTON, D. C.

UNITED STATES PATENT OFFICE.

LEE N. TALBOTT, OF DUNDAS, MINNESOTA.

SELF-LUBRICATING AXLE.

1,173,060.  Specification of Letters Patent.  Patented Feb. 22, 1916.

Application filed October 16, 1915.  Serial No. 56,180.

*To all whom it may concern:*

Be it known that I, LEE N. TALBOTT, a citizen of the United States, residing at Dundas, in the county of Rice and State of Minnesota, have invented certain new and useful Improvements in Self-Lubricating Axles, of which the following is a specification.

The invention relates to wagon axles or spindles, and more particularly to the class of self lubricating axles or spindles.

The primary object of the invention is the provision of an axle or spindle, of this character, wherein the inner end thereof is formed with a lubricant chamber which supplies grease or oil to channels or grooves disposed longitudinally of said axle or spindle, so as to thoroughly lubricate the same and the wheel, without requiring the removal of the latter for this purpose.

Another object of the invention is the provision of an axle or spindle, of this character, wherein the construction thereof is novel in form, to assure the perfect lubrication of the same.

A further object of the invention is the provision of an axle or spindle of this character, wherein the lubricant chamber has fitted therein a feed nut, which serves to disperse the lubricant, so as to assure the feed of the latter onto the axle or spindle, for the positive delivery of the same.

A still further object of the invention is the provision of an axle or spindle of this character, which is simple in construction, thoroughly reliable and efficient in operation, and inexpensive in manufacture.

With these and other objects in view the invention consists in the features of construction, combination and arrangement of parts as will be hereinafter fully described, illustrated in the accompanying drawing, and pointed out in the claims hereunto appended.

In the accompanying drawing: Figure 1, is a side elevation of a spindle or axle. Fig. 2, is a vertical longitudinal sectional view. Fig. 3, is a sectional view on the line 3—3 of Fig. 1.

Similar reference characters indicate corresponding parts throughout the several views in the drawing.

Referring to the drawing in detail, A, designates a portion of the axle iron, and B, the wheel spindle, which is integral therewith and tapers outwardly toward the free end of the same. Formed at the inner end of the spindle B, is an annular cup 5, which is arranged concentrically of the said spindle and is open at its inner side so that access can be had to the interior thereof, the cup being designed to form a chamber 6, to receive grease or lubricant to be supplied to the spindle.

Formed longitudinally in the spindle and co-extensive for a greater portion of its length are grooves or channels 7, which are equally spaced apart from each other, and at their inner ends meet orifices or openings 8, formed in an annular shoulder or flange 9, at the outer side of the cup 5, for communication with the interior thereof, so that the grease will flow through the orifices or openings 8, into the channels or grooves 7, for supplying the spindle B, with the grease or lubricant and also the wheel when journaled thereon.

The cup 5, is formed with internal screw threads 10, with which adjustably engage an exteriorly threaded flange 11, of a removable cap 12, which serves as a closure for the open side of the cup 5, to retain the grease or lubricant thereon.

The cap 12, is provided at diametrically opposite points on its outer side with spanner engaging lugs 13, to permit the use of a spanner for adjusting the cap or removing it.

From the foregoing it is thought that the construction and manner of operation of the grease or lubricant cup will be clearly understood, and therefore a more extended explanation has been omitted.

What is claimed is:

1. In an axle spindle, a grease cup formed at the inner end concentrically thereof and having an open inner side, said spindle having longitudinally disposed grooves communicating with the cup, and a cap detachably engaged in the open side of the cup.

2. In an axle spindle, a grease cup formed concentrically thereof at the inner end of the same, said spindle having longitudinally disposed grooves co-extensive with the latter for substantially the length of the same, in communication with the cup, a cap removably fitted upon said cup, and lugs on the cap.

In testimony whereof I affix my signature.

LEE N. TALBOTT.

Copies of this patent may be obtained for five cents each, by addressing the "Commissioner of Patents, Washington, D. C."